June 20, 1967   N. O. ROSAEN   3,326,375
FLUID FILTER DEVICES

Filed Dec. 6, 1965   2 Sheets-Sheet 1

INVENTOR
NILS O. ROSAEN

BY *Hauke + Hauke*
ATTORNEYS

June 20, 1967  N. O. ROSAEN  3,326,375

FLUID FILTER DEVICES

Filed Dec. 6, 1965  2 Sheets-Sheet 2

INVENTOR
NILS O. ROSAEN

BY *Hauke & Hauke*

ATTORNEYS

United States Patent Office 3,326,375
Patented June 20, 1967

3,326,375
FLUID FILTER DEVICES
Nils O. Rosaen, Bloomfield Hills, Mich., assignor to The Rosaen Filter Company, Hazel Park, Mich., a corporation of Michigan
Filed Dec. 6, 1965, Ser. No. 511,873
8 Claims. (Cl. 210—90)

The present invention relates to fluid filter devices and more particularly to those filter devices provided with valve means for closing fluid flow from the inlet to the filter chamber upon removal of the filter element.

To change the filter elements in many of the filtering devices presently in use, it is necessary to completely shut down the fluid system until the element is replaced. In many installations the reservoir for the fluid of the system may necessarily be located in the installation so that the head of fluid therein is at a higher level or elevation than the location of the filter unit. Furthermore, the filter may be actually submerged in the reservoir, near the bottom thereof. In such installations whenever change of the filter element is necessary an additional difficulty is encountered in making this change. Not only must the system be shut down but the reservoir must be drained at least to the point of elevation of the filter device.

A copending application Ser. No. 190,764, filed Apr. 27, 1962, now Patent No. 3,273,715, issued Sept. 20, 1966, discloses a filter device which is provided with a valve member operable upon removal of the filter element to move to a position closing off the filter chamber and opening a fluid path between the inlet and the outlet so that there is no need to drain the reservoir and the system can continue to operate while the filter element is being changed.

While the filter device of the aforementioned copending application has been found to perform satisfactorily generally, nevertheless occasionally dirt, metal chips or other foreign matter will become lodged between the valve member and the inner wall of the housing or the valve member will tilt slightly. When this happens, the valve member will become wedged or jammed and will not move completely to the closed position upon removal of the filter element. With the valve member in such a position, fluid will drain out through the open end of the filter housing resulting in loss of the fluid of the system and necessitating a difficult clean up operation.

The present invention overcomes this difficulty by providing means for selectively locking the filter element to the valve member so that as the filter element is axially retracted from the housing member, the valve member is pulled thereby to the closed position. The locking means are in the form of a slot and key arrangement whereby upon rotation of the filter element in one direction the element is locked to the valve member and rotation in the opposite direction releases the members so that after the valve member has been moved to the closed position the filter element can be disengaged for removal and cleaning or replacement.

It is an object then of the present invention to avoid the problem occasioned by the valve member becoming jammed in an open position in those filter devices provided with valve members for closing fluid flow to the filter chamber upon removal of the filter element by providing a novel means for selectively locking the element to the valve member to produce closing movement of the valve member upon removal of the filter element.

It is another object of the present invention to improve fluid filter devices having a valve member for closing communication with the filter chamber when the filter element is removed by arranging the valve member to be maintained in an open position by the filter element when the filter element is in place and by providing means for locking the filter element to the valve member to produce movement of the valve member to the closed position as the filter element is removed from the device.

Still further objects and advantages of the present invention will readily occur to one skilled in the art to which the invention pertains upon reference to the following description. The description makes reference to the following drawings in which like reference characters refer to like parts throughout the several views and in which.

Figure 1:
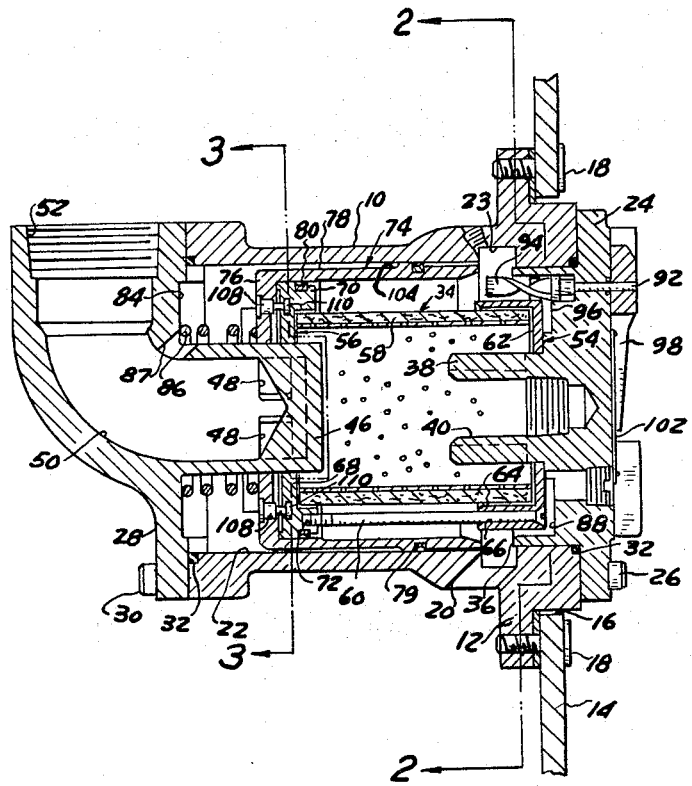
FIG. 1 is a longitudinal cross sectional view of a preferred filter device of the present invention.

In the preferred embodiment illustrated in the drawings the filter device is of the so-called "submerged" type device, that is, it is mounted on the reservoir for the fluid supply of the system with at least part of the filter device extending into the reservoir, preferably near the bottom thereof. It will be understood of course that the filter device of the present invention can be used in any type of installation and its utility is not necessarily limited to submerged type installations or even to those installations where the filter is mounted at a lower level or elevation than the head of the fluid in the reservoir.

Now referring to FIG. 1, a preferred filter device is therein illustrated as comprising a generally cylindrical housing 10 provided with a flange 12 adjacent one end. The flange 12 provides the means for mounting the housing 10 to one wall 14 of a fluid reservoir with the housing 10 extending through an opening 16 provided in the wall 14 and with the greater portion of the housing 10 positioned within the reservoir as illustrated. The flange 12 can be mounted to the wall 14 in any convenient manner such as by the screws indicated at 18.

The housing 10 is provided with an inlet 20 adjacent the flange 12 and disposed inwardly of the reservoir and opening to a substantially cylindrical chamber 22 through an annular groove 23 formed in the inner wall of the housing 10.

A rear cover 24 is removably mounted to the exterior end of the housing 10 by screws 26 and an outlet cover 28 is mounted to the interior end of the housing 10 by screws 30. O-ring seals 32 prevent fluid leakage between the housing 10 and the rear cover 24 and between the housing 10 and the outlet cover 28. The rear cover 24 upon removal from the housing 10 affords access to the chamber 22 for the removal and insertion of a filter element assembly generally indicated by the reference character 34.

The rear cover 24 is provided with an inwardly extending flange 36 which is machined to slidingly and snugly fit on its outer face the cylindrical inner surface of the housing 10. The rear cover 24 is also provided with a boss portion 38 which extends axially into the chamber 22 and which provides the means for axially slidably mounting one end of the filter element assembly 34 as will become more apparent as the description proceeds. The boss portion 38 is in the form of a hollow tubular construction having spaced wall sections removed to form annularly spaced, axially extending slots 40 opening to the interior of the boss portion 38.

The outlet cover 28 is provided with a tubular extension 46 extending axially into the chamber 22. The end of the tubular extension 46 is preferably closed and is provided near the closed end with a plurality of annularly spaced slots 48 opening to the interior of the tubular extension 46. The outlet cover 28 is provided with an outlet passage 50 connecting the interior of the tubular extension 46 with an outlet 52. The outlet 52 is preferably positioned on an axis which is substantially normal to the axis of the tubular extension 46 so that the outlet passage 50 is curved as illustrated. The outlet 52 is adapted for connection to an outlet pipe (not shown) extending to the exterior of the fluid resevoir and adapted for connection to a suitable fluid user (not shown).

The filter element assembly 34 preferably comprises a rear element cap 54, a front element cap 56 and a substantially cylindrical filter element 58 sandwiched between the caps 54 and 56 by a plurality of annularly spaced screws 60. The rear cap 54 preferably comprises a radially extending portion 62 axially slidably received on the outer surface of the boss portion 38 of the rear cover 24 and an axially extending flange portion 64 formed integrally with the radially outermost edge of the portion 62 and disposed about the outer surface of the end of the filter element 58. The screws 60 are disposed within holes 66 provided in the flange portion 64.

The front element cap 56 preferably comprises a radially extending portion 68 axially slidably received on the outer surface of the tubular extension 46 and an axially extending flange portion 70 formed integrally with the radially outermost edge of the portion 68 and disposed about the outer surface of the end of the filter element 58. The ends of the screws 60 are received by threaded holes 72 formed in the flange portion 70.

A valve member 74 is carried in the chamber 22 and comprises a radially formed portion 76 axially slidably mounted on the tubular extension 46 and an axially elongated cylindrical portion 78 integrally formed at the radially outermost edge of the portion 76. The cylindrical portion 78 carries on its outer surface and adjacent its free end a piston ring 79, which engages the inner surface of the housing 10. The flange portion 70 of the front element cap 56 is provided on its exterior surface with a piston ring 80 which engages the inner surface of the valve member 74. This provides a radial spacing between the inner surface of the valve member 74 and the outer surface of the filter element 58 and the free end of the valve member 74 terminates short of the end of the filter element 58.

An annular recess 84 formed in the outlet cover 28 provides the means for retaining a spring member 86. The spring member 86 urges the valve member 74 against the front element cap 56 and the fitler assembly 34 against the rear cover 24. A port 87 provides communication between the outlet passage 50 and the portion of the chamber 22 in which the spring member 86 is located.

It is apparent that as the invention has thus far been described, the filter assembly 34 will normally be maintained in the position illustrated in FIG. 1 with the spring member 86 urging the rear element cap 54 against the rear cover 24. In this position fluid is directed through the inlet 20 axially intermediate the free end of the valve member 74 and the filter element 58, radially inwardly through the filter element 58 and through the tubular extension 46 to the outlet 52. As the filter element 58 begins to become clogged, the pressure differential across the element 58 will increase. This increase in pressure differential is also present across the radially extending portion 62 of the rear element cap 54. An annular groove 88 formed in the rear cover 24 and connected with the inlet groove 23 insures that inlet pressure will be transmitted to the rear surface of the cap 54 even when the cap 54 is disposed against the cover 24. The difference in pressure is also present across portions of the front element cap 56 and the valve member 74. This is occasioned by the fact that a portion of the rear surface of the flange portion 70 is exposed to inlet fluid pressure and the front surface of valve member 74 is exposed to outlet pressure by means of the port 87 formed in the tubular extension 46.

Thus as the filter element 58 becomes clogged, the increased pressure differential across the rear element cap 54 and also across the front element cap 56 and the valve member 74 will cause the filter assembly 34 and the valve member 74 to move axially to the left as seen in FIG. 1 against the force of the spring member 86. This movement will of course be dependent upon the degree of clogging of the filter element 58 so that by providing means exteriorly of the device to indicate the axial position of the filter assembly 34 a means for indicating the condition of the filter element 58 will be provided.

Figure 2:
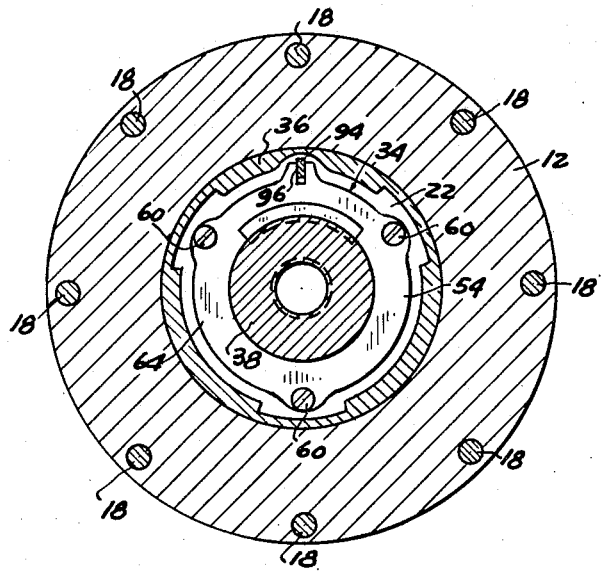
FIG. 2 is a cross sectional view taken substantially on line 2—2 of FIG. 1.
Figure 4:
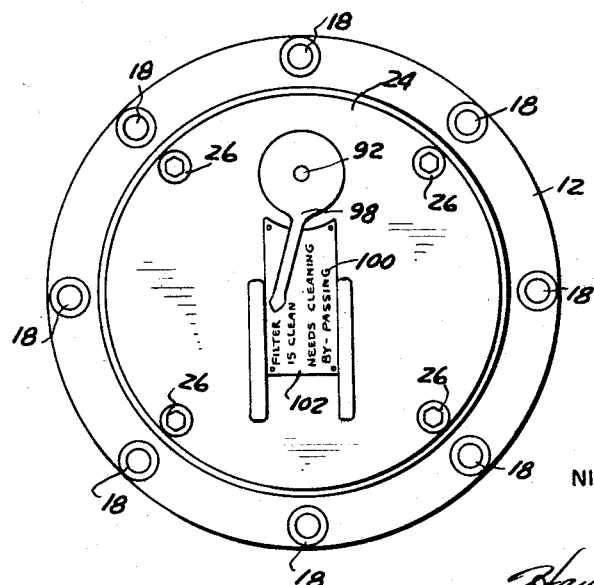
FIG. 4 is an end elevational view as seen from the right side of FIG. 1.

A preferred means for indicating the condition of the filter element 58 is illustrated in FIGS. 2 and 4 as comprising a shaft 92 rotatably mounted in the rear cover 24 and extending into the chamber 22 on an axis parallel with the axis of movement of the filter assembly 34. The interior end of the shaft 92 has fixed thereto an actuator element 94 so that rotation of the actuator element 94 produces rotation of the shaft 92. The actuator element 94 comprises a strip of flat material having a uniform twist about its longitudinal axis from end to end thereof and is received in a rectangular slot 96 formed in rear element cap 54. Thus movement of the filter assembly 34 causes the surfaces forming the slot 96 to engage the sides of the actuator element 94 to produce rotation thereof and thus rotation of the shaft 92, such rotation being dependent upon the extent of axial movement of the filter assembly 34. A pointer element 98 is secured to the exterior end of the shaft 92 for rotation therewith and points to suitable indicia 100 provided on an indicator plate 102 as can best be seen in FIG. 4 for indicating the condition of the filter element 58.

As the filter element 58 continues to become clogged, the filter assembly 34 will continue to move until the rear ends of the slots 40 formed in the boss portion 38 are opened to the inlet side of the filter assembly 34. When the filter assembly reaches this position, fluid will flow directly from the inlet 22 through the slots 40 to the interior of the filter element 58 and from there to the outlet 52 thus bypassing the filter element 58. This position of the filter assembly 34 will also be indicated by the pointer element 98 and the indicia 100.

As the invention has thus far been described, it is substantially that as disclosed in the aforementioned copending application. The improvement over that structure will now be described in detail. Like the device of the aforementioned copending application, the device of the present invention is intended to function to permit continued operation of the device when the rear cover 24 is removed to permit removal of the filter assembly 34 for cleaning or replacement of the filter element 58. In the device of the aforementioned copending application, the spring member 86 was depended upon to move the valve member 74 to a closed position upon the filter assembly 34 being removed. In the closed position the valve member 74 directs fluid from the inlet 22 axially along a reduced outer surface portion 104 of the valve member 74 and through the slots 48 to the outlet 52. With the valve member 74 in the closed position the piston ring 78 is moved to a position sealing off the inlet 22 from the open end of the housing 10. The problem sometimes encountered in the device of the aforementioned copending application was occasioned by the tendency of the valve member 74 becoming jammed in some intermediate position upon removal of the filter assembly 34. This could be caused by foreign matter becoming wedged intermediate the valve member 74 and the inner surface of the housing 10 or by the valve member 74 becoming cocked or tilted on the tubular extension 46. In any event when this happens the valve member 74 will not move to the closed position and fluid will flow through the open end of the housing 10 and necessitating that the system be shut down.

To prevent this, the valve member 74 and the filter assembly 34 are provided with means for selectively locking the filter assembly 34 to the valve member 74 to insure that as the filter assembly is removed from the housing 10, the valve member 74 will be pulled thereby to the closed position.

Figure 3:
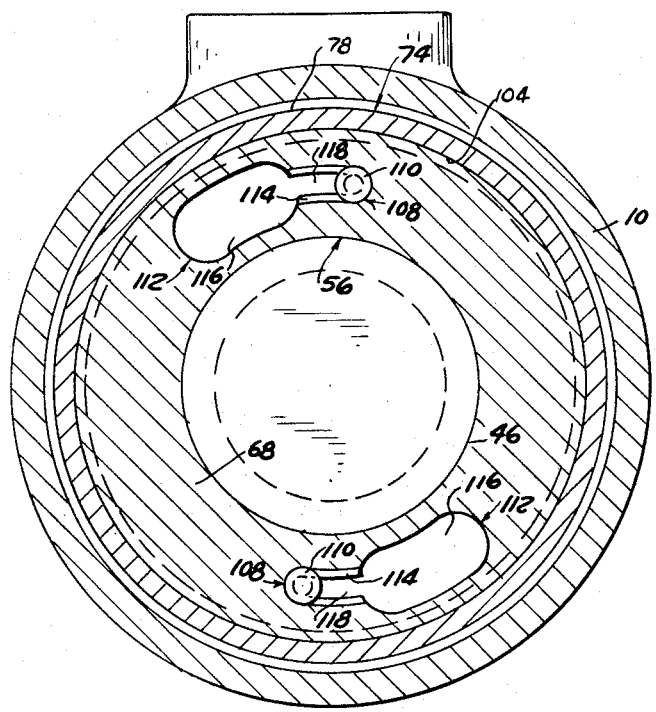
FIG. 3 is a cross sectional view taken substantially on line 3—3 of FIG. 1, and enlarged somewhat for purposes of clarity.

These means as can best be seen in FIGS. 1 and 3 preferably comprise a pair of spaced pin members 108 carried by the radially extending portion 76 of the valve member 74 and extending therefrom in an axial direction toward the rear cover 24. The pin members 108 are provided at their free ends with an enlarged head portion 110 adapted to be received in spaced arcuate recesses 112 formed in the surface of the front element cap 56 facing the valve member 74. The recesses 112 as can best be seen in FIG. 3, are each provided with a lip portion 114 which forms an enlarged portion 116 and a reduced portion 118 of the recesses 112. The reduced portions 118 extend arcuately from the enlarged portions 116 preferably in a clockwise direction as shown. The enlarged portions 116 are adapted to receive the head portions 110 of the pin members 108 and upon rotation of the filter assembly 34 in a clockwise direction, the front element cap 56 will be rotated to bring the pin members 108 into the reduced portions 118 of the recesses 112. In this position the head portions 110 of the pin members 108 will be beneath the lip portions 114 to thereby prevent axial separation of the filter assembly 34 and the valve member 74. Thus with the filter assembly 34 and the valve member 74 locked together in this manner, removal of the filter assembly 34 will pull the valve member 74 to the closed position without the danger of the valve member becoming locked in some intermediate position. When the valve member 74 has been moved to the closed position the filter assembly 34 can be rotated in a counter-clockwise direction to release the locking means and to permit the filter element 58 to be cleaned and/or replaced while the valve member 74 permits the system to continue operating.

In normal operation the filter assembly 34 and the valve member 74 can either be left locked together since this will not interfere with the desired axial movement of the filter assembly 34 or these members can be left unlocked to be locked only when the element is to be removed.

It is apparent that an important improvement has been provided over the device of the aforementioned copending application and that modifications and changes in the preferred embodiment can be made without departing from the spirit of the invention as expressed by the appended claims.

I claim:
1. A filter device comprising
    (a) a housing defining a chamber and having an inlet and an outlet open to said chamber,
    (b) a filter assembly removably carried in said chamber intermediate said inlet and said outlet,
    (c) a valve member movably carried in said chamber and operable upon being moved to a closed position to close said inlet, said filter assembly comprising an axially slidable filter element positioned in said chamber in engagement with said valve member to normally retain said valve member in a position opening fluid flow from said inlet through said filter element and to said outlet, and
    (d) means for selectively locking said filter assembly to said valve member to produce movement of said valve member toward said closed position upon movement of said filter assembly out of said chamber and unlocking said valve member and said assembly to permit axial separation.

2. The device as defined in claim 1 and in which said locking means comprises a coacting slot and pin operable to lock said assembly and member together upon relative rotation thereof in one direction and to unlock said assembly and member to permit axial separation upon rotation in an opposite direction.

3. The device as defined in claim 2 and including pressure responsive means axially slidably moving said filter element within said chamber in response to changes in the pressure differential across said filter element.

4. The device as defined in claim 3 and including means mounted exteriorily of said housing and actuated by means extending into said chamber and engaging with said filter assembly to indicate the axial position and therefore the condition of said filter element.

5. The device as defined in claim 3 and including a bypass valve means controlled by axial movement of said filter element and opened only after a predetermined axial movement of said filter element for bypassing fluid around said filter element.

6. The device as defined in claim 3 and including a bypass valve means controlled by the axial movement of said filter element and opened only after a predetermined axial movement of said filter element to bypass fluid from said inlet around said filter element and indicating means mounted exteriorly of said filter housing and controlled by axial movement of said filter element to indicate the condition of said filter element.

7. The device as defined in claim 3 and including spring means urging said filter element in opposition to the movement produced by said pressure responsive means.

8. The device as defined in claim 1 and in which
    (a) said valve member comprises a radially extending portion and an axially extending cylindrical portion,
    (b) said cylindrical portion normally receiving one end of said filter assembly with said radially extending portion normally engaging said radially extending portion to maintain said valve member in an open position.

References Cited

UNITED STATES PATENTS

| | | | |
|---|---|---|---|
| 922,657 | 5/1909 | Worsey | 210—234 |
| 2,991,885 | 7/1961 | Gutkowski | 210—235 X |
| 3,244,282 | 4/1966 | Rosaen | 210—90 |
| 3,273,715 | 9/1966 | Rosaen | 210—90 |

SAMIH N. ZAHARNA, *Primary Examiner.*